US012779506B2

(12) United States Patent
Zhu

(10) Patent No.: US 12,779,506 B2
(45) Date of Patent: Nov. 3, 2026

(54) SURFACE CLEANER

(71) Applicant: SUZHOU HIMORE KINGJET TECHNOLOGY CO., LTD., Suzhou (CN)

(72) Inventor: Liang Zhu, Suzhou (CN)

(73) Assignee: SUZHOU HIMORE KINGJET TECHNOLOGY CO., LTD., Suzhou (CN)

( * ) Notice: Subject to any disclaimer, the term of this patent is extended or adjusted under 35 U.S.C. 154(b) by 224 days.

(21) Appl. No.: 18/798,777

(22) Filed: Aug. 8, 2024

(65) Prior Publication Data

US 2025/0289036 A1 Sep. 18, 2025

(30) Foreign Application Priority Data

Mar. 12, 2024 (CN) ........................ 202420469152.5

(51) Int. Cl.
*B08B 3/02* (2006.01)
*B05B 1/14* (2006.01)
*B05B 3/02* (2006.01)

(52) U.S. Cl.
CPC ................ *B08B 3/024* (2013.01); *B05B 1/14* (2013.01); *B05B 3/02* (2013.01); *B08B 2203/0247* (2013.01)

(58) Field of Classification Search
None
See application file for complete search history.

(56) References Cited

U.S. PATENT DOCUMENTS 3,645,791 A * 2/1972 Sadwith .................. A47L 15/30 134/25.4
5,135,015 A * 8/1992 Young ..................... B08B 3/024 134/179
5,494,227 A * 2/1996 Costantini ........... B05B 13/0278 134/172
2005/0217708 A1* 10/2005 Otterson ................. B08B 3/024 134/198
2007/0113368 A1* 5/2007 Alexander .............. B08B 3/026 15/385
2024/0189841 A1* 6/2024 Wei ....................... E03C 1/0408

FOREIGN PATENT DOCUMENTS

CN 112122222 A * 12/2020 ............. B05B 3/027
EP 1312419 A1 * 5/2003 ............... B05B 3/06
EP 2747891 B1 * 12/2018 ............. B08B 3/024
EP 3381565 B1 * 4/2020 ............... B05B 9/01

* cited by examiner

*Primary Examiner* — Omair Chaudhri

(57) ABSTRACT

The present disclosure discloses a surface cleaner, including a connector, where a rotary valve sleeve is connected to the bottom of the connector, a rotary valve core is connected to the interior of the rotary valve sleeve, a valve body is connected to two ends of the rotary valve core, a rotating valve core is connected to the bottom of the valve body, a water outlet pipe is connected to the bottom of the rotating valve core, and a nozzle is connected to each of two sides of the water outlet pipe. The surface cleaner disclosed in the present disclosure has the advantages of compact structure, stable performance, low cost, long service life, high safety, and wide use range, and is capable of meeting the requirements of a long service life for commercial use and a low price for household use.

9 Claims, 11 Drawing Sheets

SURFACE CLEANER

CROSS REFERENCE TO RELATED APPLICATIONS

The present application claims the benefit of Chinese Patent Application No. 202420469152.5 filed on Mar. 12, 2024, the contents of which are incorporated herein by reference in their entirety.

TECHNICAL FIELD

The present disclosure relates to the field of surface cleaners, and in particular to a surface cleaner.

BACKGROUND ART

A surface cleaner is one of key components for generating pressurized liquid jets, and is capable of generating a water jet that rotates at a high speed. Such the surface cleaner is normally connected to a spray gun through quick connection, with high cleaning efficiency and low probability of producing splash water which causes secondary contamination on the surface of other objects, and thus is widely favored by users.

Regarding a core part of the surface cleaner (excluding a housing), there are relatively advanced surface cleaners currently existing in the art of three main structures shown below:

I) In a surface cleaner of the structures of FIG. 1 and FIG. 2, a bearing is used as a rotating support member, and a first valve plate and a second valve plate are tightly fitted together by means of an action of a spring and high pressure water. When the high pressure water is jetted from two nozzles, an inclination angle α (see FIG. 2) by which the nozzle is mounted causes a water jet to produce reaction thrust in the horizontal direction, which pushes the nozzle to rotate around a rotary valve core at a high speed. The rotary valve core rotating at a high speed drives the second valve plate to rotate together therewith, producing high speed plane friction with the first valve plate and forming a seal on a friction surface.

Due to the use of the first valve plate, the second valve plate, and the bearing, the first valve plate and the second valve plate are very hard and wear-resistant, endowing the surface cleaner the primary advantage of a long service life, which is suitable for use in commercial situations.

The primary disadvantages of the surface cleaner of the above structure are expensiveness and a large volume, so that the surface cleaner is adaptive to less occasions, affordable by less people, generally used only in commercial occasions, and therefore is always low in sales volume.

II) For main parts of a surface cleaner of the structures in FIG. 3 and FIG. 4, except for a fixed valve core and a rotary valve sleeve which are metal parts, most of the other parts are mainly plastic parts. When the high pressure water is jetted from two nozzles, an inclination angle α (see FIG. 4) by which the nozzle is mounted causes a water jet to produce reaction thrust in the horizontal direction, which pushes the nozzle to rotate around the fixed valve core at a high speed.

Since most of the parts are mainly plastic parts, the surface cleaner is cheaper and more suitable for home use.

For the surface cleaner of the above structure since most of the parts are mainly plastic parts, the primary disadvantages thereof are that it can only withstand a relatively small pressure because the plastic parts are prone to cracks, and it has a relatively large volume, which is generally suitable for only household products with low pressures. Due to the high probability of cracks of the plastic parts, the surface cleaner of this structure has a relatively short service life, in which case the surface cleaner is cheaper but requires a higher replacement frequency, and therefore the use cost is relatively high.

III) A surface cleaner of the structures in FIG. 5 and FIG. 6 is used at a highest amount by far. The primary advantages of the surface cleaner are compact structure, stable performance, and moderate price and life service, making the surface cleaner a cost-effective surface cleaner. When the high pressure water is jetted from two nozzles, an inclination angle α (see FIG. 6) by which the nozzle is mounted causes a water jet to produce reaction thrust in the horizontal direction, which pushes the nozzle to rotate around the fixed valve core at a high speed.

The surface cleaner uses no bearing or plastic parts, and therefore is cost-effective, applicable to a wide range of occasions, and adaptive to multiple fields, such as commercial and household fields.

Although the surface cleaner of the above structure is cost-effective, due to a matching step in a structure of the fixed valve core and a rotary water distributor, when part of the pressure water flows along a gap between the fixed valve core and the rotary water distributor through an opening seal ring to reach the matching step at a washer, relatively large upward thrust may be produced on the rotary water distributor, and may be transferred to a gasket. Since the rotary water distributor rotates at a high speed relative to a valve body, friction and wear are produced between the valve body and the gasket and between the gasket and the rotary water distributor, thereby affecting the service life of the surface cleaner of this structure to some extent. In addition, two outlet pipes are connected to the rotary water distributor by threads, so that when the outlet pipes or nozzles hit an obstacle during high speed operation, the outlet pipes have a risk of detaching from the rotary water distributor, and the detached outlet pipes may cause danger to an operator or others because of a high speed. Furthermore, this surface cleaner is still a little expensive if used as a household surface cleaner. Accordingly, there are fewer household surface cleaners.

SUMMARY OF THE INVENTION

The present disclosure provides a surface cleaner, which is capable of meeting the requirements of a long service life for commercial use and a low price for household use.

In order to achieve the above purpose, the present disclosure adopts the following technical solution: a surface cleaner, including a connector, wherein a rotary valve sleeve is connected to the bottom of the connector, a rotary valve core is connected to the interior of the rotary valve sleeve, a valve body is connected to two ends of the rotary valve core, a rotating valve core is connected to the bottom of the valve body, a water outlet pipe is connected to the bottom of the rotating valve core, and a nozzle is connected to each of two sides of the water outlet pipe.

Furthermore, a water inlet screen is provided at a water inlet of the connector.

Furthermore, the rotating valve core is provided with a steel ball at an upper end, a thin head rivet is provided at a joint between the valve body and the rotating valve core, and the thin head rivet and the steel ball abut on each other.

Furthermore, a first O-ring is provided between the valve body and the rotary valve core.

Furthermore, an eleventh O-ring is provided between the water outlet pipe and the rotating valve core.

Furthermore, a second O-ring is provided between the rotary valve sleeve and the rotary valve core.

Furthermore, a first U-pin is provided in the valve body.

Furthermore, a sheath is connected to the bottom of the rotating valve core.

Furthermore, the valve body is provided with a first plug and a second plug therein.

Furthermore, an opening seal ring is provided between the valve body and the rotating valve core.

Furthermore, the water outlet pipe is provided with third plugs at both ends.

Furthermore, a pressure plate is attached to a lower end of the valve body.

Furthermore, a fixed valve sleeve is provided between the valve body and the rotating valve core.

The surface cleaner disclosed in the present disclosure has the following beneficial effects:

1. A structure form in which the steel ball is used as a rotating support may extend the service life.
2. The water outlet pipe and the rotating valve core are connected using only one sheath, greatly simplifying a connection structure and making the structure compact.
3. Due to the low cost, high pressure resistance, and long service life, the surface cleaner is adaptive to both commercial and household uses.
4. The use of nylon and fiberglass with an inlaid metal valve sleeve makes the price advantage more prominent.

Figure 1:
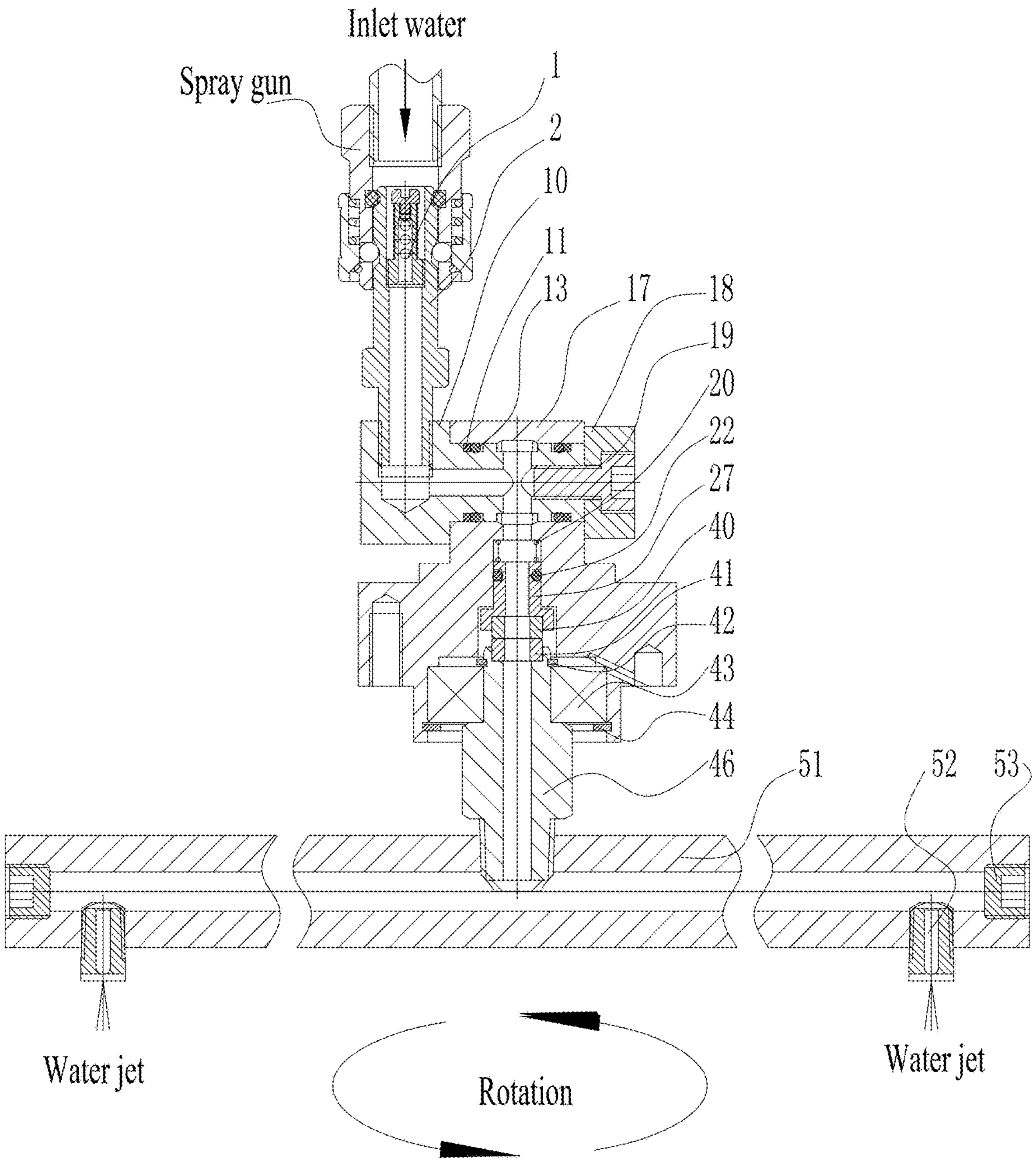
FIG 1 (Prior Art)
FIG. 1 is a schematic structural diagram of a first prior-art surface cleaner according to the present disclosure.
Figure 2:
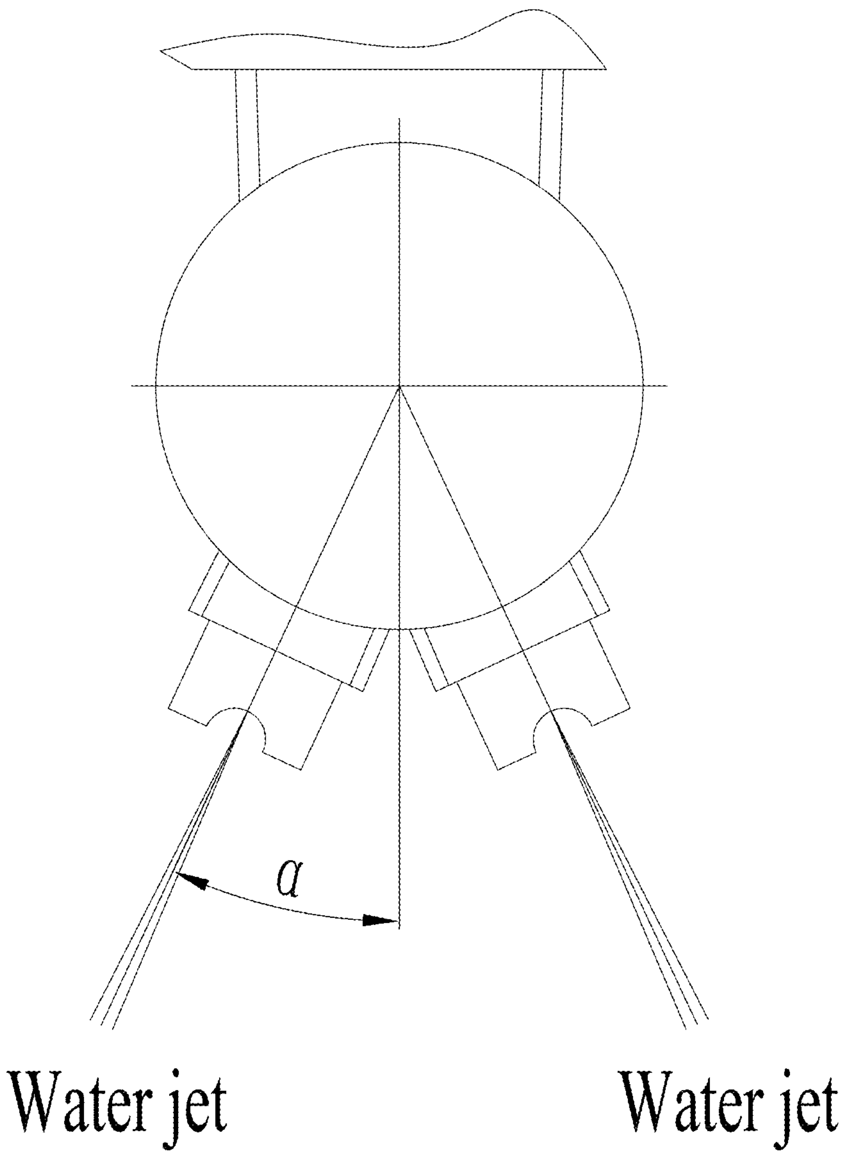
FIG 2 (Prior Art)
FIG. 2 is a local side view of the first prior-art surface cleaner according to the present disclosure.
Figure 3:
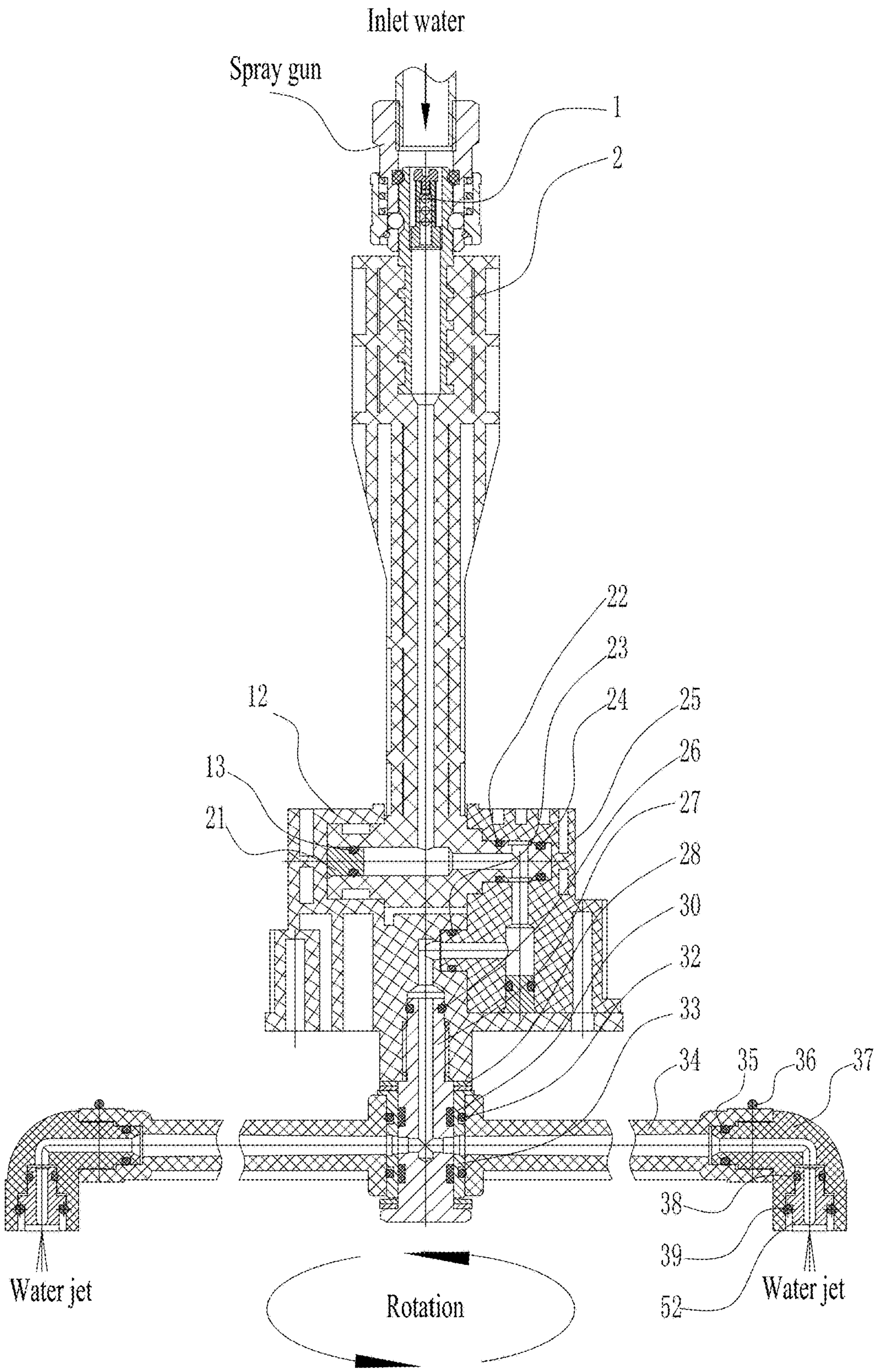
FIG 3 (Prior Art)
FIG. 3 is a schematic structural diagram of a second prior-art surface cleaner according to the present disclosure.
Figure 4:
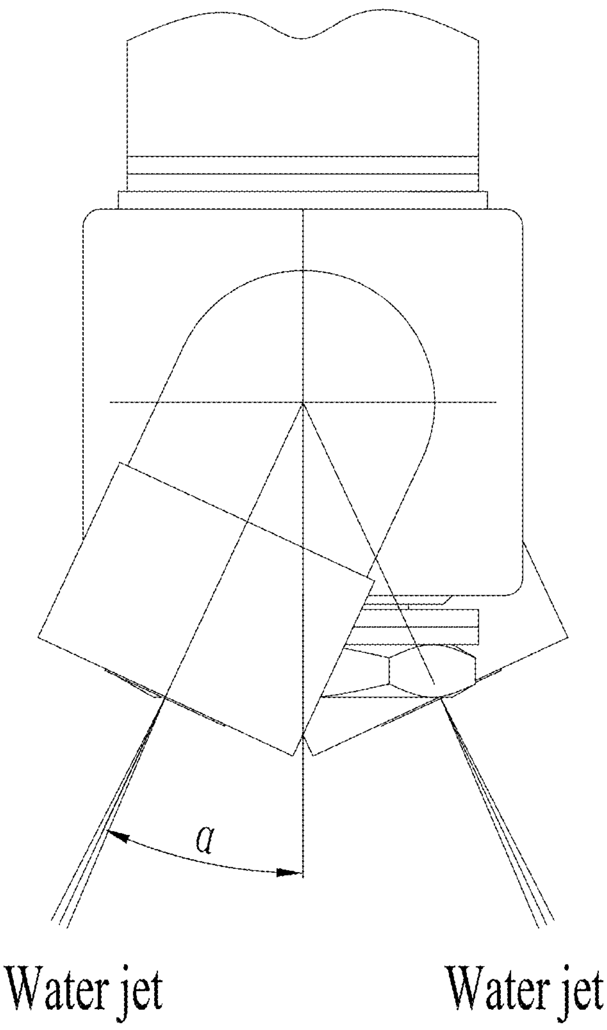
FIG 4 (Prior Art)
FIG. 4 is a local side view of the second prior-art surface cleaner according to the present disclosure.
Figure 5:
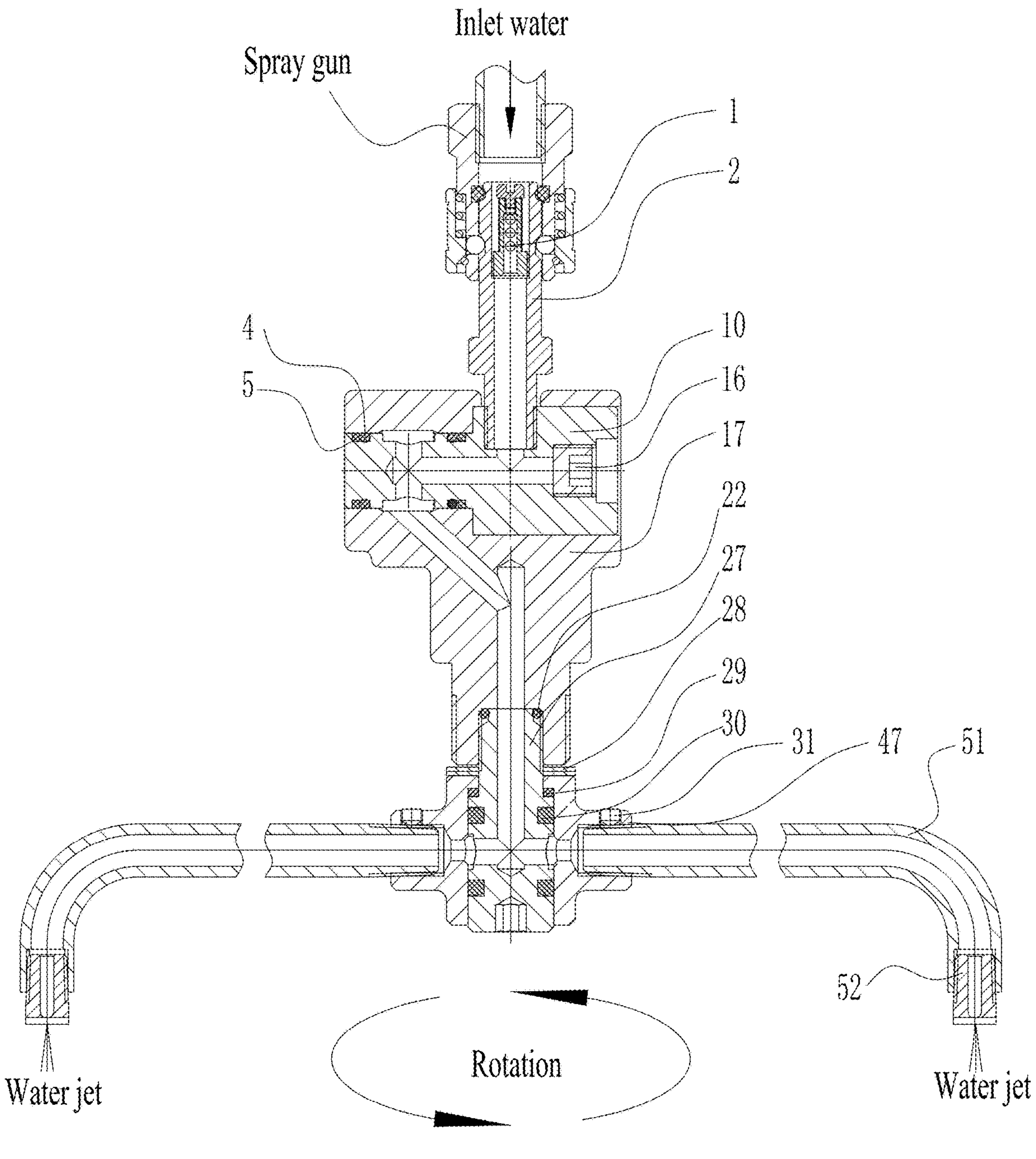
FIG 5 (Prior Art)
FIG. 5 is a schematic structural diagram of a third prior-art surface cleaner according to the present disclosure.
Figure 6:
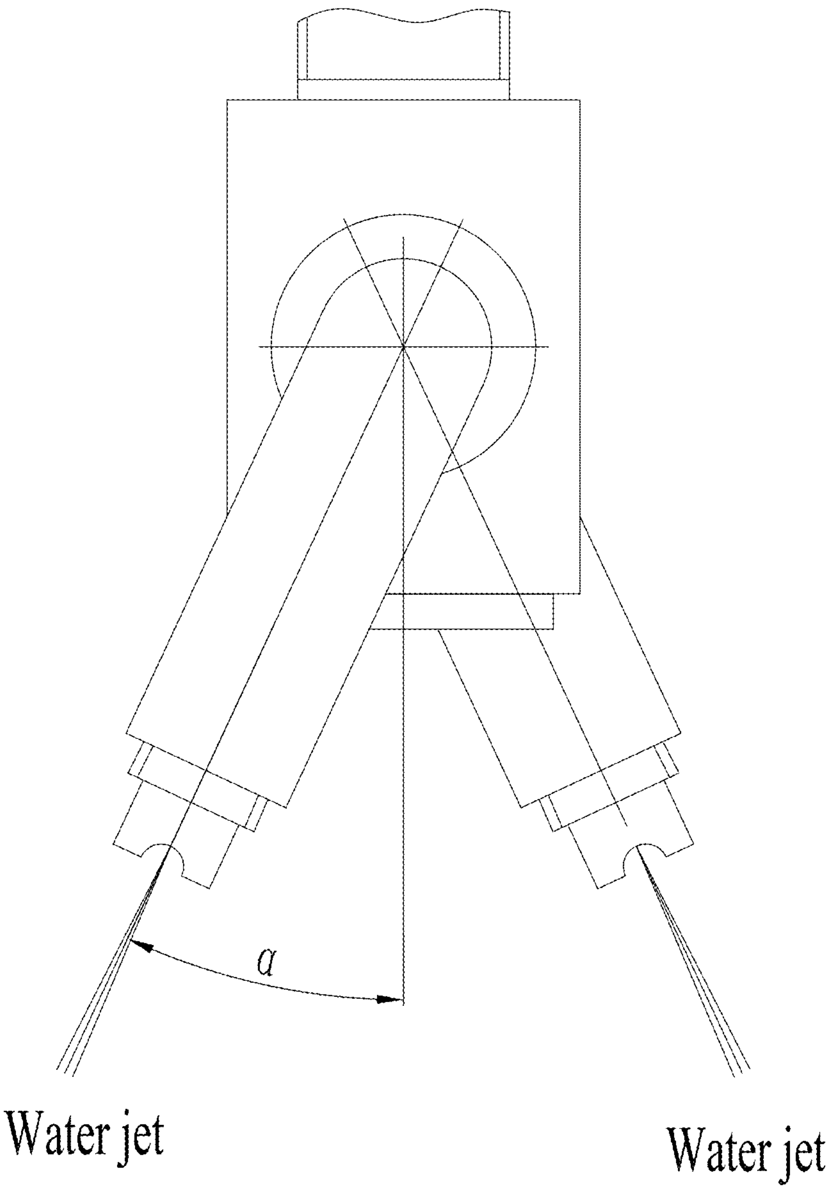
FIG 6 (Prior Art)
FIG. 6 is a local side view of the third prior-art surface cleaner according to the present disclosure.

List of reference numerals: 1, water inlet screen; 2, connector; 3, connector (injection molding); 4, sealing ring; 5, opening stop ring 1; 6, first O-ring; 7, rotary valve sleeve; 8, first U-pin; 9, the second O-ring; 10, rotary valve core; 11, opening stop ring 2; 12, valve body (injection molding); 13, third O-ring; 14, thin head rivet; 15, steel ball; 16, plug 1; 17, valve body; 18, stop block; 19, plug bolt; 20, spring; 21, end cap; 22, fourth O-ring; 23, fifth O-ring; 24, sixth O-ring; 25, valve cover (injection molding); 26, seventh O-ring; 27, fixed valve core; 28, gasket; 29, washer; 30, opening seal ring; 31, tightening screw; 32, eighth O-ring; 33, rotating valve sleeve; 34, water outlet pipe (injection molding); 35, ninth O-ring; 36, second U-pin; 37, nozzle connector (injection molding); 38, tenth O-ring; 39, third U-pin; 40, first valve plate; 41, second valve plate; 42, elastic shaft stop ring; 43, bearing; 44, the elastic hole stop ring; 45, plug 2; 46, rotating valve core; 47, rotating water distributor; 48, pressure plate; 49, sheath; 50, eleventh O-ring; 51, water outlet pipe; 52, nozzle; 53, third plug; 54, fixed valve sleeve.

DETAILED DESCRIPTION OF EMBODIMENTS

In order to make the purpose, technical solution and advantages of embodiments of the present disclosure clearer, the technical solution in the embodiments of the present application will be clearly and completely described below in conjunction with the drawings. Obviously, the described embodiments are only part of the embodiments of the present application, rather than all of the embodiments. Based on the embodiments in the present disclosure, all other embodiments obtained by those skilled in the art without the practice of inventive effort shall fall into the protection scope of the present disclosure.

In addition, it should also be noted that in the description of the present disclosure, the terms "mount", "couple" and "connect" should be interpreted in a broad sense unless otherwise explicitly defined and limited. For example, the terms may indicate a fixed connection, a detachable connection, or an integral connection; may indicate a mechanical connection or an electrical connection; and may indicate a direct connection or an indirect connection implemented via an intermediate medium, or internal communication between two elements. For those skilled in the art, the specific meanings of the foregoing terms in the disclosure can be interpreted according to a specific situation.

Embodiment I

Figure 7:
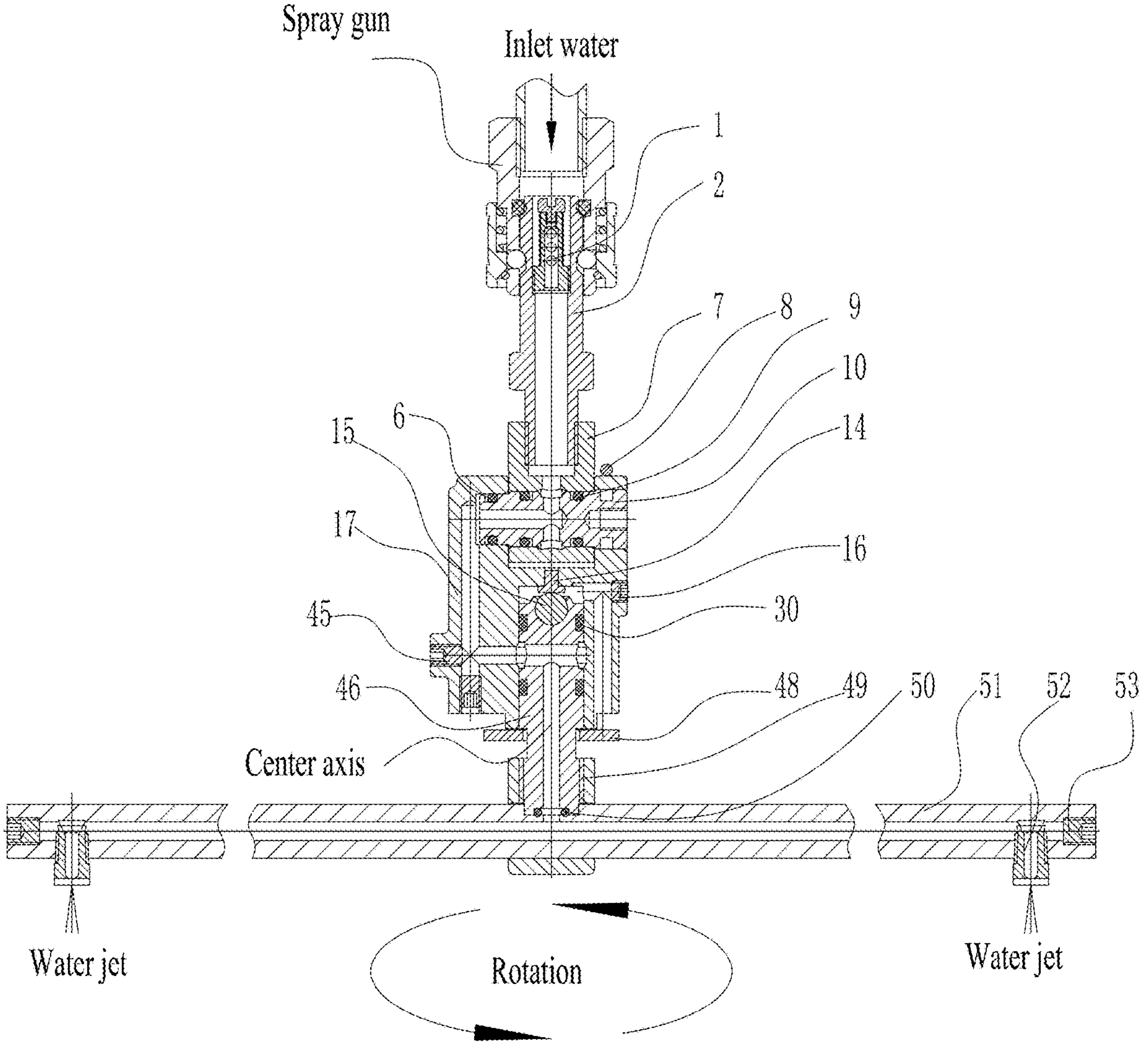
FIG. 7 is a schematic structural diagram of a first embodiment of a surface cleaner disclosed in the present disclosure.
Figure 8:
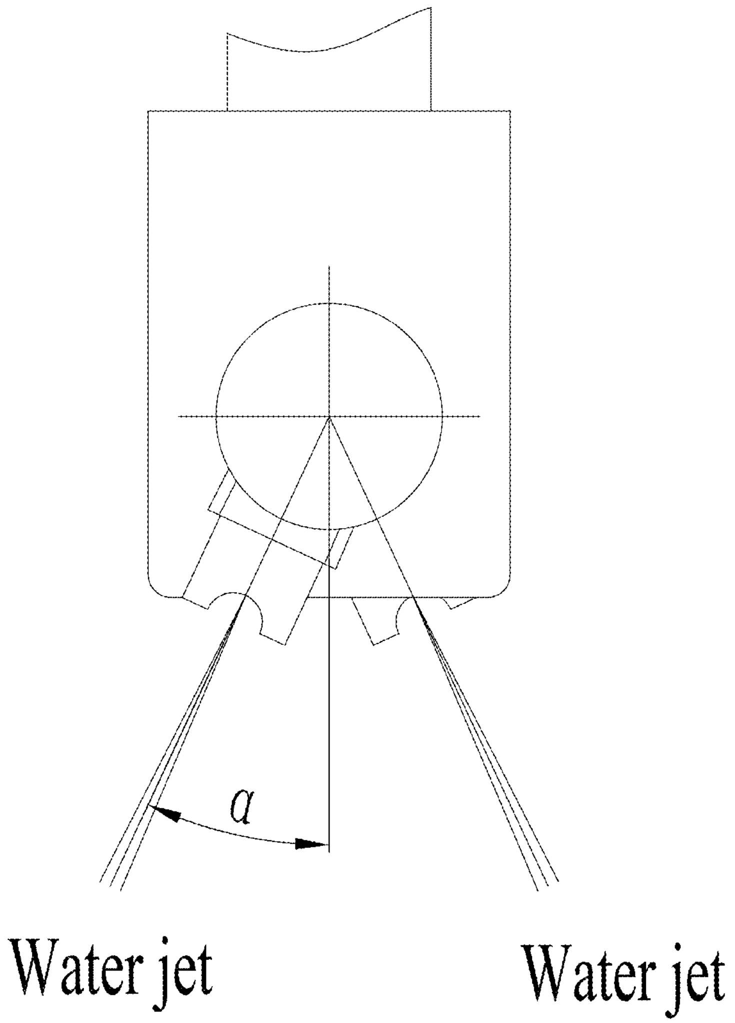
FIG. 8 is a local side view of the first embodiment of the surface cleaner disclosed in the present disclosure.
Figure 9:
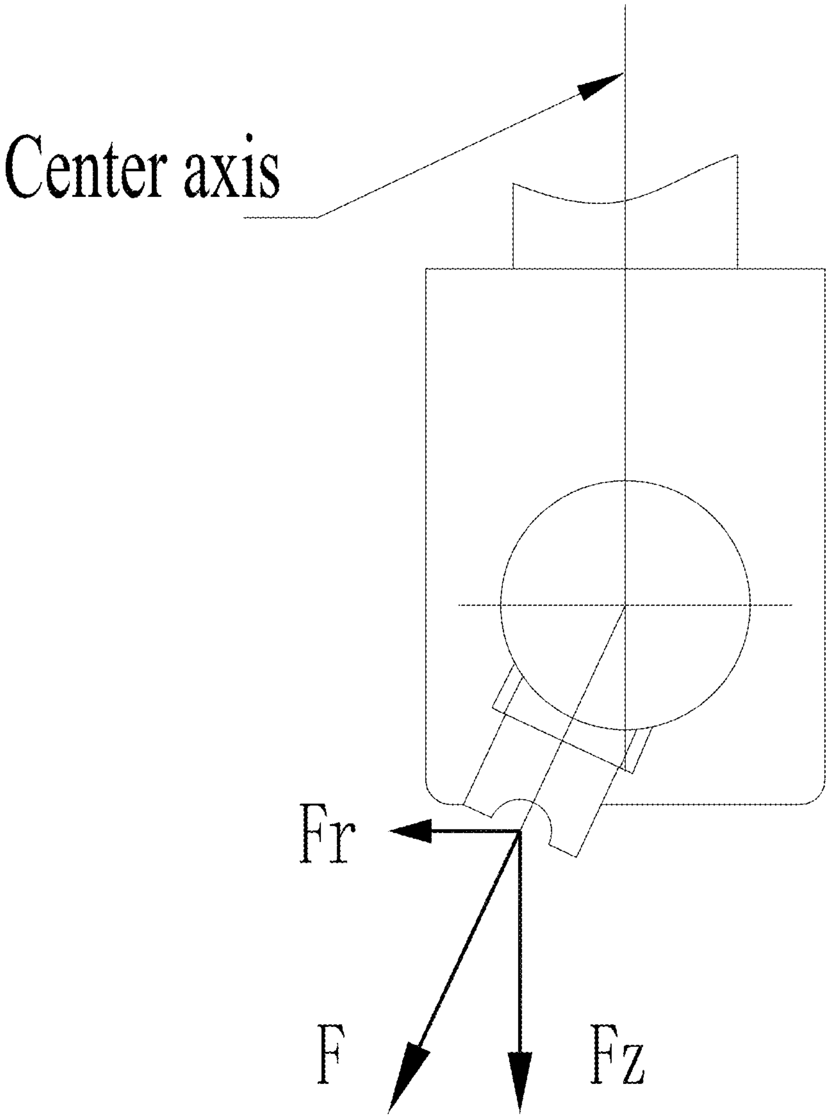
FIG. 9 is a force bearing analysis diagram of the surface cleaner disclosed in the present disclosure.

Referring to FIGS. 7-9, the present disclosure provides a surface cleaner, including a connector 2, where a water inlet at an upper end of the connector 2 is connected to a spray gun, a water outlet at a bottom end of the connector 2 is sleeved with a rotary valve sleeve 7, the rotary valve sleeve 7 is provided therein with a valve sleeve transverse flow channel and a valve sleeve vertical flow channel in communication with the valve sleeve transverse flow channel, and the valve sleeve vertical flow channel is in communication with the connector 2.

A rotary valve core 10 in communication with the rotary valve sleeve 7 is inserted in the valve sleeve transverse flow channel of the rotary valve sleeve 7, so that the water flowing down from the rotary valve sleeve 7 can enter the rotary valve core 10. The rotary valve core 10 is provided with a rotary valve core 10 flow channel, and an axial direction of the rotary valve core 10 flow channel is on the same straight line with the axis of the valve sleeve transverse flow channel.

Two ends of the rotary valve core 10 protrude from the valve sleeve transverse flow channel of the rotary valve sleeve 7, and protrusions of both ends are sleeved with a valve body 17 in communication with the rotary valve core 10. The valve body 17 is provided with a valve body 17 vertical flow channel in communication with the rotary valve core 10 flow channel and a valve body 17 transverse flow channel in communication with the valve body 17 vertical flow channel. An accommodating groove is provided below the valve body 17, and a rotating valve core 46 capable of rotating around the center axis of the accommodating groove is embedded in the accommodating groove. The rotating valve core 46 has an upper portion embedded in the accommodating groove and a lower portion disposed outside the accommodating groove, and the rotating valve core 46 is provided with a rotating valve core 46 flow channel in communication with the valve sleeve transverse flow channel.

The rotating valve core 46 is connected to a water outlet pipe in communication with the rotating valve core 46 at the bottom thereof. The water outlet pipe is connected to nozzles respectively on two sides thereof, the nozzles including a left nozzle and a right nozzle, where a shaft of the left nozzle and a shaft of the water outlet pipe form an angle $\alpha$, and a shaft of the right nozzle and the shaft of the water outlet pipe form an angle-a.

In this embodiment, a water inlet screen 1 is provided at the water inlet of the connector 2.

Meanwhile, the rotating valve core 46 is provided with a recess at an upper end thereof, and a steel ball 15 is rotationally provided in the recess, where the radius of a mouth of the recess is less than the radius of the steel ball 15, so that the steel ball 15 cannot fall out of the recess.

Meanwhile, the accommodating groove is riveted with a thin head rivet 14 at a bottom surface thereof, and the thin head rivet 14 and the steel ball 15 abut on each other.

In this embodiment, a first O-ring 6 is provided between the valve body 17 and the rotary valve core 10, an eleventh O-ring 50 is provided between the water outlet pipe 51 and the rotating valve core 46, a second O-ring 9 is provided between the rotary valve sleeve 7 and the rotary valve core 10, and an opening seal ring 30 is provided between the valve body 17 and the rotating valve core 46.

A first U-pin 8 is inserted in the valve body 17, and positions of the valve body 17 and the rotary valve core 10 are fixed by means of the first U-pin 8.

The rotating valve core 46 is connected to a sheath 49 at the bottom thereof, and the sheath 49 is fixedly disposed at the bottom of the rotating valve core 46 by means of threaded connection. Meanwhile, the sheath 49 is provided with a through hole at the bottom thereof, and the water outlet pipe 51 penetrates through the through hole.

Meanwhile, the valve body 17 is provided with a first plug 16 and a second plug 45 therein, and the water outlet pipe is provided with third plugs 53 at both ends.

In this embodiment, the valve body 17 is bolted to a pressure plate 48 at a bottom end thereof, positions of the valve body 17 and the rotating valve core 46 are fixed by means of the pressure plate 48.

As shown in FIG. 9, a high pressure water jet of the surface cleaner generates an action force F, the action force F generates a component force Fr in a circumferential direction of rotation around the center axis, and a reaction force of the component force Fr may push the nozzle 52 to rotate around the center axis. In addition, the action force F also generates a component force Fz in a direction parallel to the center axis, and the force Fz may act on a surface to be cleaned, thereby cleaning the surface.

During a cleaning process of the surface cleaner, the action force Fz applied by the high pressure water jet produced by the nozzle 52 to the ground forms a reaction force −Fz, the two nozzles 52 may produce −2Fz upward thrust, and a combined force −2Fz+G is formed after deleting weights of the nozzles 52, the water outlet pipe 51, the sheath 49, the rotating valve core 46, and the steel ball 15 (assuming that a sum of the weights of these parts is G). The combined force is the upward thrust applied by the steel ball 15 to the thin head rivet 14. Since the steel ball 15 serves as the rotation support and a position on the thin head rivet 14 in contact with the steel ball 15 is a flat plane, there is theoretically only one contact point between the thin head rivet 14 and the steel ball 15, and the point is on the center axis. Under the action of the −2Fz+G force, the thin head rivet 14 and the steel ball 15 produce an extrusion deformation. Since the thin head rivet and the steel ball are both relatively hard steel parts, their actual deformations are small, and a contact surface produced due to the deformations therefore is very small. Accordingly, a linear velocity of a relative motion between the thin head rivet 14 and the steel ball 15 at the contact point during the cleaning process is very small, causing a very small amount of wear, and resulting in a quite long service life. Less material is consumed in fabricating such the structure which is very compact, and therefore the fabrication cost is low.

Embodiment II

Figure 10:
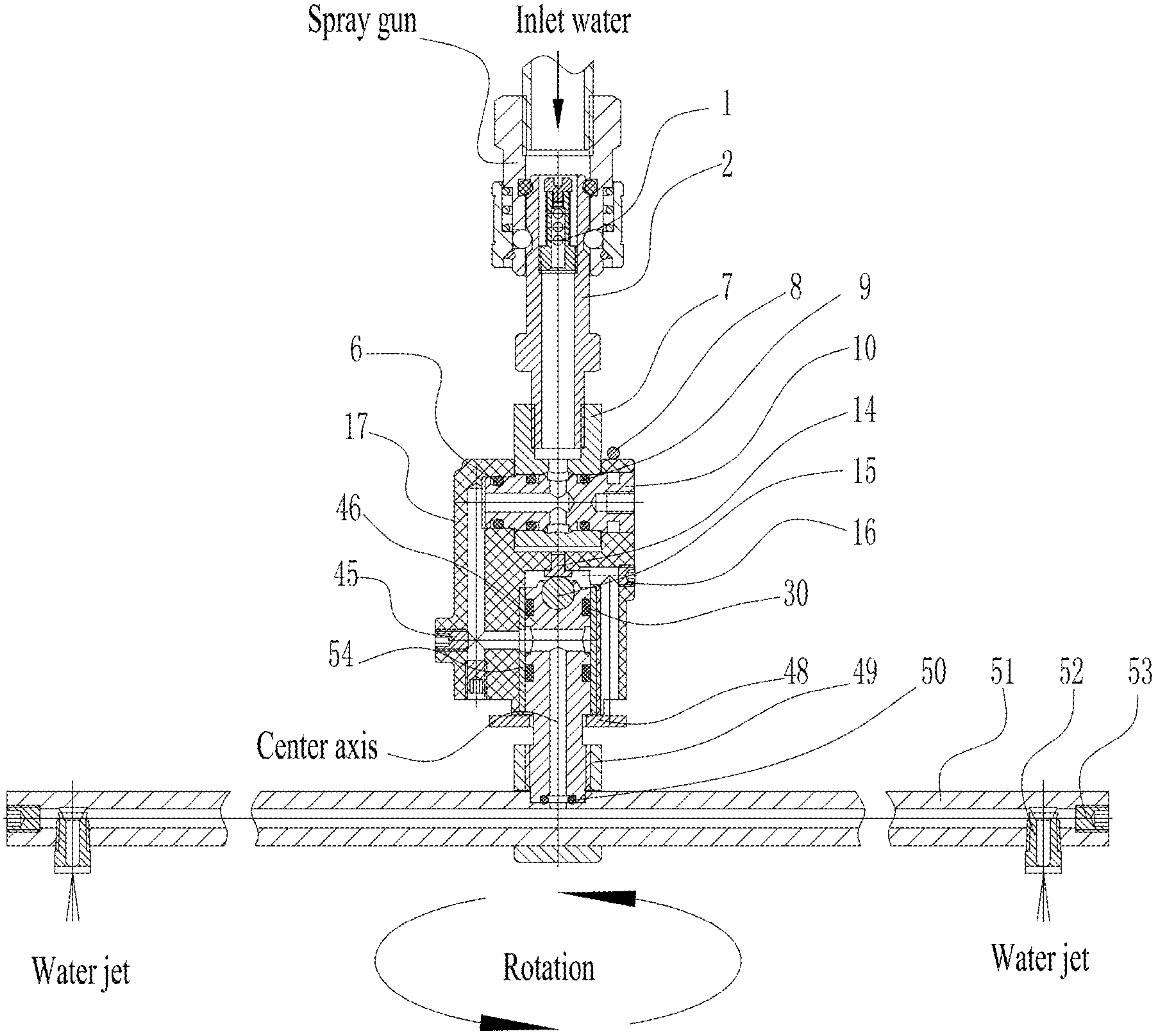
FIG. 10 is a schematic structural diagram of a second embodiment of the surface cleaner disclosed in the present disclosure.
Figure 11:
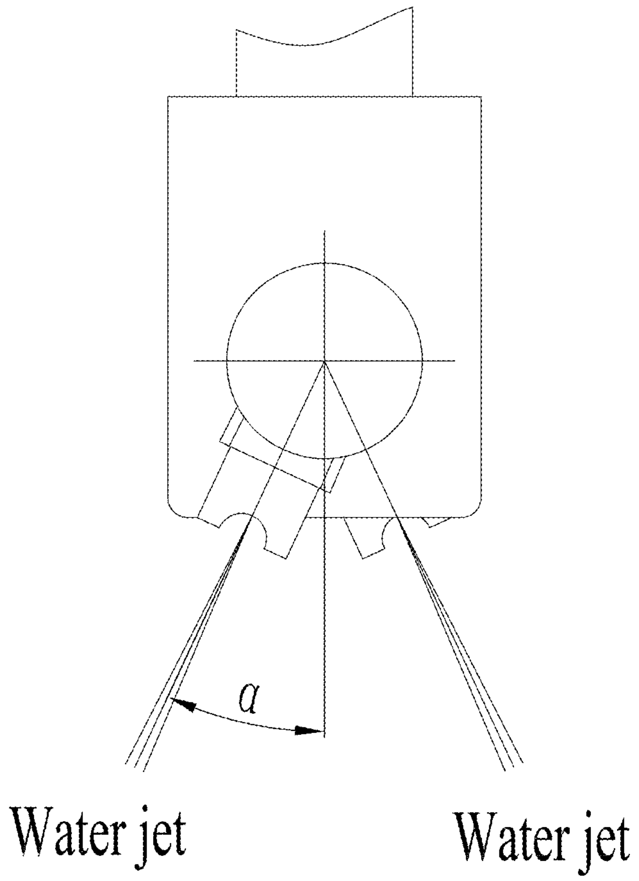
FIG. 11 is a local side view of the second embodiment of the surface cleaner disclosed in the present disclosure.

As shown in FIGS. 10-11, in this embodiment, the valve body 17 is made of materials nylon and fiberglass, and a fixed valve sleeve 54 is inlaid between the valve body 17 and the rotating valve core 46, the fixed valve sleeve 54 being made of a metal material.

Such the structure has little change in pressure resistance and service life relative to that in Embodiment 1, but has more prominent price advantage because the materials of the valve body 17 are nylon and fiberglass.

The device embodiments described above are merely schematic, in which units described as separate components may or may not be physically separated, and components shown as units may or may not be physical units, that is, they may be located in one place, or may be distributed to multiple network units. Part or all of the modules may be selected according to an actual need to achieve the purposes of the solutions of the embodiments. Those of ordinary skill in the art can understand and implement the present disclosure without the practice of inventive effort.

Finally, it should be noted that the above embodiments are used only to illustrate the technical solutions of the present disclosure and are not limitations thereto. Although the present disclosure has been described in detail with reference to the above embodiments, those skilled in the art should understand that: they can still modify the technical solutions recited in the above embodiments or make equivalent substitutions for some of the technical features therein; and these modifications or substitutions do not cause the essence of the corresponding technical solutions to depart from the spirit or scope of the technical solutions of the embodiments of the present disclosure.

What is claimed is:

1. A surface cleaner, comprising a connector, wherein a rotary valve sleeve is connected to a bottom of the connector, a rotary valve core is connected to an interior of the rotary valve sleeve, a valve body is connected to two ends of the rotary valve core, a rotating valve core is connected to a bottom of the valve body, a water outlet pipe is connected to a bottom of the rotating valve core, and a nozzle is connected to each of two sides of the water outlet pipe;

wherein the rotating valve core is provided with a steel ball at an upper end, a thin head rivet is provided at a joint between the valve body and the rotating valve core, and the thin head rivet and the steel ball abut on each other.

2. The surface cleaner according to claim 1, wherein a water inlet screen is provided at a water inlet of the connector.

3. The surface cleaner according to claim 1, wherein a first O-ring is provided between the valve body and the rotary valve core.

4. The surface cleaner according to claim 1, wherein an eleventh O-ring is provided between the water outlet pipe and the rotating valve core, a second O-ring is provided between the rotary valve sleeve and the rotary valve core, and an opening seal ring is provided between the valve body and the rotating valve core.

5. The surface cleaner according to claim 1, wherein a first U-pin is provided in the valve body.

6. The surface cleaner according to claim 1, wherein a sheath is connected to the bottom of the rotating valve core.

7. The surface cleaner according to claim 1, wherein the valve body is provided with a first plug and a second plug therein, and the water outlet pipe is provided with third plugs at both ends.

8. The surface cleaner according to claim 1, wherein a pressure plate is attached to a lower end of the valve body.

9. The surface cleaner according to claim 1, wherein a fixed valve sleeve is provided between the valve body and the rotating valve core.

* * * * *